US010498798B2

(12) United States Patent
Zhang

(10) Patent No.: US 10,498,798 B2
(45) Date of Patent: Dec. 3, 2019

(54) ELECTRONIC DEVICE AND METHOD FOR SPLITTING FILE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yu-Yong Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 296 days.

(21) Appl. No.: 15/603,483

(22) Filed: May 24, 2017

(65) Prior Publication Data

US 2017/0346881 A1  Nov. 30, 2017

(30) Foreign Application Priority Data

May 25, 2016 (CN) .......................... 2016 1 0354965

(51) Int. Cl.
*H04L 29/08* (2006.01)
*G06F 3/06* (2006.01)
*G06F 16/16* (2019.01)
*H04L 12/835* (2013.01)

(52) U.S. Cl.
CPC .............. *H04L 67/06* (2013.01); *G06F 3/061* (2013.01); *G06F 3/067* (2013.01); *G06F 3/0659* (2013.01); *G06F 16/16* (2019.01); *H04L 47/30* (2013.01)

(58) Field of Classification Search
CPC ......... H04L 67/06; H04L 47/30; G06F 16/16; G06F 3/061; G06F 3/0659; G06F 3/067
See application file for complete search history.

(56) References Cited

U.S. PATENT DOCUMENTS

2005/0053095 A1* 3/2005 Kato .................... G06K 7/0008
370/474
2007/0299324 A1* 12/2007 Rasch-Menges .... A61B 5/0002
600/301
2009/0196294 A1* 8/2009 Black ................... H04L 1/1607
370/394

FOREIGN PATENT DOCUMENTS

CN  101707623 A  *  5/2010

* cited by examiner

*Primary Examiner* — Jason D Recek
*Assistant Examiner* — Lesa M Kennedy
(74) *Attorney, Agent, or Firm* — ScienBiziP, P.C.

(57) ABSTRACT

A method of splitting files applied to an electronic device includes obtaining a single file from a predetermined location. The number of blocks into which the file is to be split is calculated using a preset formula according to a capacity of a send buffer of a memory of the electronic device and also a calculated probability of availability of a transmitting channel. The file is split into the number of blocks.

17 Claims, 4 Drawing Sheets

| n | 1/n | P(x, n, v) |
|---|---|---|
| 5 | 0.2 | 0.91 |
| 6 | 0.167 | 0.92 |
| 7 | 0.142 | 0.93 |
| 8 | 0.125 | 0.935 |

FIG. 4

ELECTRONIC DEVICE AND METHOD FOR SPLITTING FILE

CROSS-REFERENCE TO RELATED APPLICATIONS

This application claims priority to Chinese Patent Application No. 201610354965.X filed on May 25, 2016, the contents of which are incorporated by reference herein.

FIELD

The subject matter herein generally relates to data transmitting technology, and particularly to an electronic device and a method for splitting files.

BACKGROUND

A device may have a memory with a small size, and the device may need to transmit files to another device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 illustrates an exemplary embodiment of a calculating of the number of blocks.

DETAILED DESCRIPTION

Figure 1:
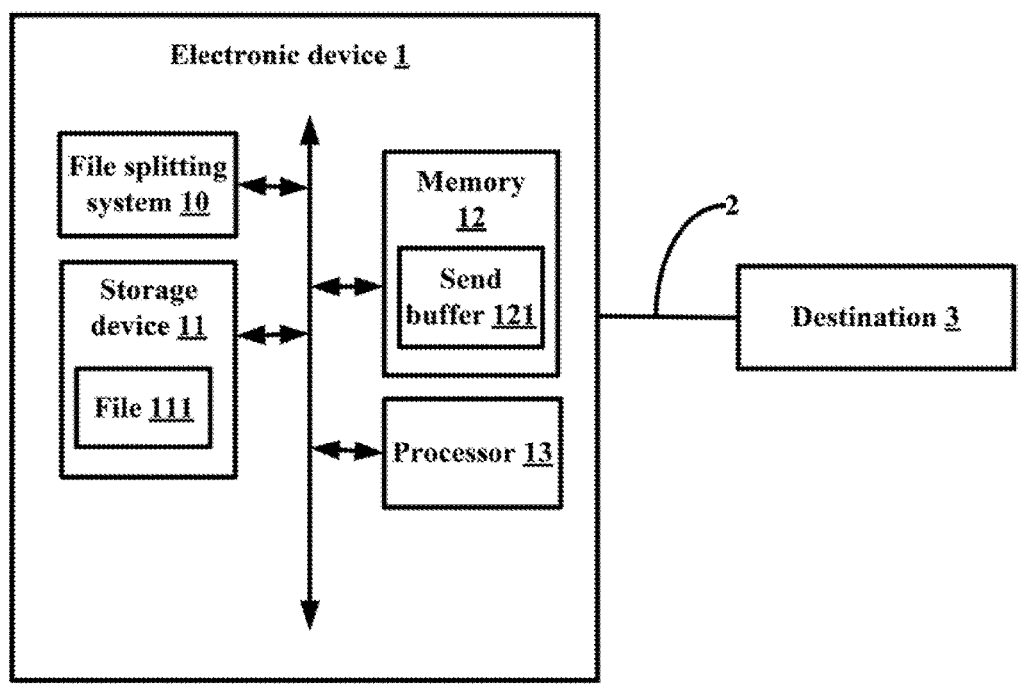
FIG. 1 is a block diagram of an exemplary embodiment of an electronic device including a file splitting system.
Figure 2:
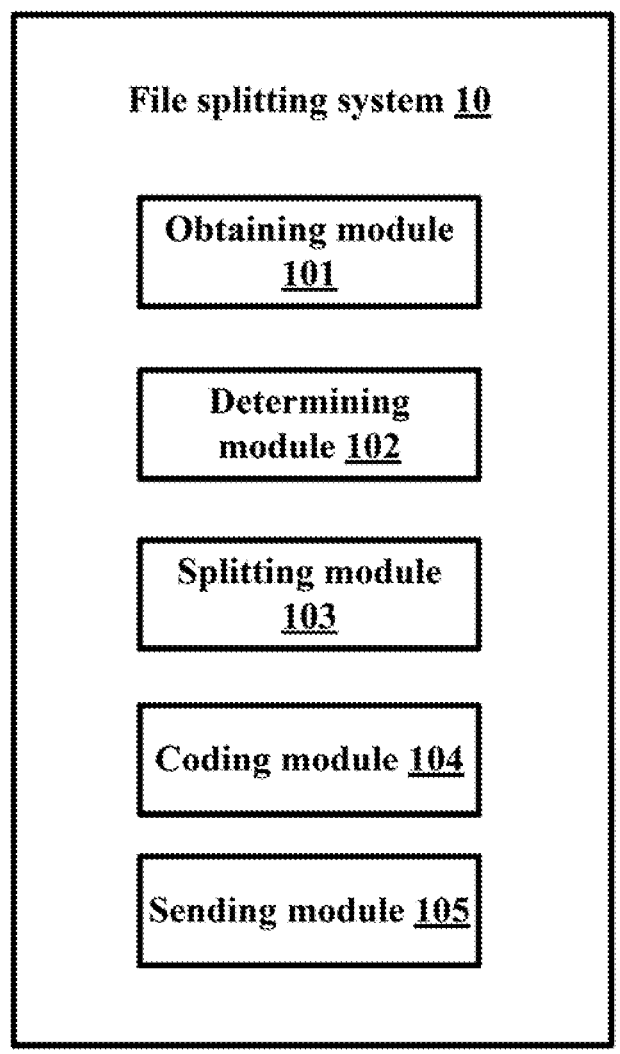
FIG. 2 illustrates an exemplary embodiment of modules of the file splitting system of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an exemplary embodiment of an electronic device including file splitting system. Depending on the exemplary embodiment, an electronic device 1 may include, but is not limited to, a file splitting system 10, a storage device 11, a memory 12, and at least one processor 13. The electronic device 1 can be a mobile phone, a tablet computer, a personal digital assistant, a personal computer, or a server. It should be noted that FIG. 1 illustrates only one exemplary embodiment of the electronic device 1. An electronic device 1 may have different configurations such as different electrical systems, operating systems, etc.

In at least one exemplary embodiment, the memory 12 includes a send buffer 121 that can be used to buffer data to be sent. The file splitting system 10 can transmit a file 111 from a predetermined location to a destination 3 using the send buffer 12 through a transmitting channel 2. In at least one exemplary embodiment, the file splitting system 10 pre-stores the file 111 in the storage device 11, i.e., the predetermined location is the storage device 11. The destination 3 can be another electronic device such as a mobile phone, a tablet computer, a personal digital assistant, a personal computer, or a server. In at least one exemplary embodiment, a size of the file 111 can be greater than a capacity of the memory 12. In at least one exemplary embodiment, the file 111 can be downloaded by the file splitting system 10 from a device such as a server, and stored in the storage device 11. In at least one exemplary embodiment, the file 111 can be a file of any type such as a text file, or an audio file.

The transmitting channel 2 can be any conventional wired network, or wireless network. The wired network can be any category of conventional wired communications, for example, the Internet, or local area network (LAN). The wireless network can be any category of conventional wireless communications, for example, radio, WI-FI, cellular, satellite, and broadcasting. Exemplary suitable wireless communication technologies comprise, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZIGBEE, BLUETOOTH, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

In at least one exemplary embodiment, the storage device 11 can be used to store all kinds of data and programs. In at least one exemplary embodiment, the storage device 11 can be an internal storage or an external storage device of the electronic device 1. For example, the storage device 11 can be a secure digital card, a smart media card, or a flash card.

In at least one exemplary embodiment, the file splitting system 10 can include an obtaining module 101, a determining module 102, a splitting module 103, a coding module 104, and a sending module 105. The modules 101-105 include computer instructions or codes in the form of one or more programs that may be executed by the at least one processor 13.

The obtaining module 101 can obtain the file 111 from a predetermined location.

In at least one exemplary embodiment, when the file 111 is stored in the storage device 11, the storage device 11 is the predetermined location. In other exemplary embodiments, when the file 111 is stored in another storage device such as a server, the other storage device is the predetermined location.

In at least one exemplary embodiment, the obtaining module 101 can obtain the file 111 from the storage device 11. In other exemplary embodiments, when the file 111 is stored in another storage device such as the server, the obtaining module 101 can directly download the file 111 from the server.

The determining module 102 can calculate a number of blocks into which the file 111 is to be split using a preset formula according to a capacity of the send buffer 121 and a probability of availability of the transmitting channel 2. In at least one exemplary embodiment, the probability of availability of the transmitting channel 2 can be defined to be a probability of the transmitting channel 2 is available to transmit data.

In at least one exemplary embodiment, the determining module 102 can calculate the probability of availability of the transmitting channel 2 according to an average time of the transmitting channel 2 being available to transmit data in a predetermined time period (such as 30 minutes, or 45 minutes) and an average time of repairing the transmitting channel 2 in the predetermined time period.

In at least one exemplary embodiment, the predetermined time period equals a sum of the average time of the transmitting channel 2 being available to transmit data and the average time of repairing the transmitting channel 2. The probability of availability of the transmitting channel 2 equals a value that is obtained by dividing the average time of the transmitting channel 2 being available to transmit data by the predetermined time period.

In at least one exemplary embodiment, the preset formula is:

$$P_{(x,n,v)} = \begin{cases} \dfrac{t_F - \dfrac{x}{n*v}}{t_F + t_R}, & \dfrac{x}{n*v} \in [0, t_F) \\ 0, & \dfrac{x}{n*v} \in [t_F, +\infty] \end{cases}$$

Wherein "P(x, n, v)" represents a probability of the transmitting channel 2 successfully transmitting the file 111, "$t_F$" represents the average time of the transmitting channel 2 being available to transmit data, "$t_R$" represents the average time of repairing the transmitting channel 2, "x" represents the size of the file 111, "n" represents the number of blocks into which the file 111 is to be split, "v" represents a speed of the transmitting channel 2 transmitting the file 111, and $$\frac{x}{n*v}$$

represents a time length of the transmitting channel 2 transmitting each block of the split file 111. Further, as can be seen from the preset formula, $$\frac{t_F}{t_F + t_R}$$

represents the probability of availability of the transmitting channel 2.

In at least one exemplary embodiment, the determining module 102 can calculate the number of blocks using the preset formula according to the following conditions. The conditions include:

A first condition: a size of each block (i.e., a value of "x/n") is less than the capacity of send buffer 121; and A second condition: under the first condition is met, the size of each of the number of blocks (i.e., the value of "x/n") reaches the maximum size.

In other exemplary embodiments, the determining module 102 can calculate the number of blocks using the preset formula according to the first condition and a third condition. The third condition is: under the first condition is met, a value of "P(x, n, v)" reaches the maximum value.

The following examples are to clarify. It is assumed that the average time of the transmitting channel 2 being available to transmit data (i.e., "$t_F$") equals 340 seconds, the average time of repairing the transmitting channel 2 (i.e., "$t_R$") equals 10 seconds, the size of the file 111 is 1 GB, the speed of the transmitting channel 2 transmittings the file 111 is 0.01 GB per second (GB/s), and the capacity of the send buffer 121 is 0.15 GB.

For a first example, as shown in FIG. 4, if "n" equals five (i.e., if the file 111 is split into five blocks), then the size of each of the five blocks equals 0.2 GB, thus the size of each of the five blocks is greater than the capacity (e.g., 0.15 GB) of the send buffer 121. Therefore, the first condition is not met. For a second example, if "n" equals six (i.e., if the file 111 is split into six blocks), then the size of each of the six blocks equals 0.167 GB, and the size of each of the six blocks is greater than the capacity (e.g., 0.15 GB) of the send buffer 121. Therefore, the first condition is again not met. For a third example, if "n" equals seven (i.e., if the file 111 is split into seven blocks), then the size of each of the seven blocks equals 0.142 GB, and the value of P(x, n, v) equals 0.93. If "n" is equal to eight (i.e., if the file 111 is split into eight blocks), then the size of each of the eight blocks equals 0.125 GB, and the value of P(x, n, v) equals 0.935. Therefore, when "n" equals seven or eight, the size of each of the "n" blocks is less than the capacity of the send buffer 121. Further, when "n" equals seven, the size of each of the "n" blocks reaches the maximum possible size (i.e., 0.142 GB). Therefore, the determining module 102 can determine that the number of split blocks of the file 111 equals seven according to the first and second conditions. In other exemplary embodiments, the determining module 102 can determine that the number of split blocks of the file 111 should be eight according to the first and third conditions.

The splitting module 103 can split the file 111 into the number of blocks.

For example, the splitting module 103 can split the file 111 into seven blocks. A size of each of the seven blocks equals 0.142 GB.

The coding module 104 can code each of the number of blocks, and obtain the number of coded blocks.

In at least one exemplary embodiment, the coding module 104 can code each of the number of blocks by converting each of the number of blocks into binary format, octal format, or decimal format.

The sending module 105 can read each of the number of coded blocks and buffer each coded block in the send buffer 121 according to an order of coding. The sending module 105 can further execute data encapsulation for each of the number of coded blocks according to a file transfer protocol (e.g., file delivery over unidirectional transport (FLUTE) protocol). The sending module 105 can send each encapsulated block to the destination 3 through the transmitting channel 2.

Figure 3:
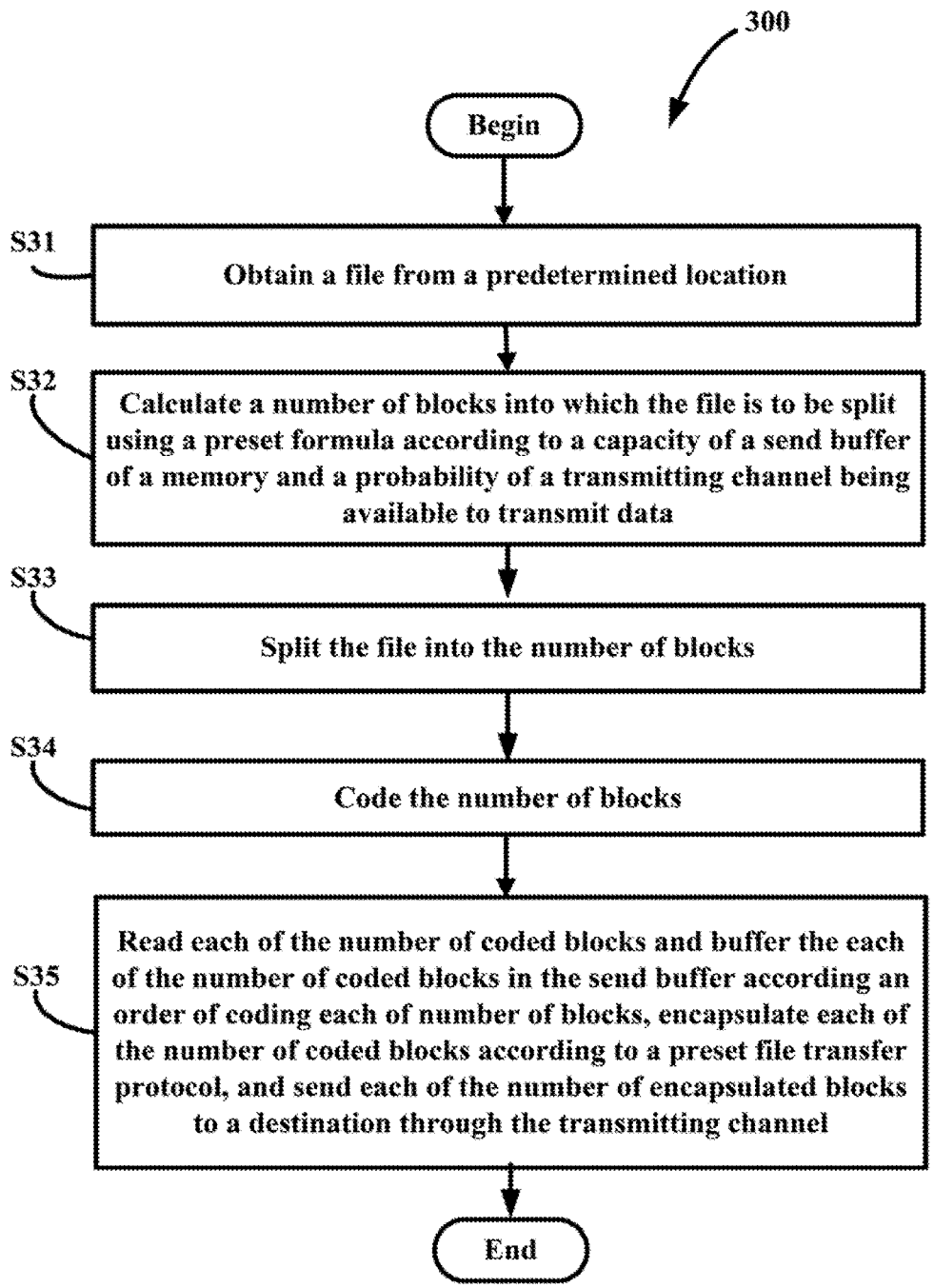
FIG. 3 illustrates a flowchart of an exemplary embodiment of a method of splitting a file into a number of blocks.

FIG. 3 illustrates an exemplary embodiment of a flowchart of a file splitting method. The exemplary method 300 is provided by way of example, as there are a variety of ways to carry out the method. The method 300 described below can be carried out using the configurations illustrated in FIG. 1, for example, and various elements of these figures are referenced in explaining exemplary method 400. Each block shown in FIG. 3 represents one or more processes, methods, or subroutines, carried out in the exemplary method 300. Additionally, the illustrated order of blocks is by way of example only and the order of the blocks can be changed. The exemplary method 300 can begin at block 31. Depending on the exemplary embodiment, additional steps can be added, others removed, and the ordering of the steps can be changed.

At block 31, the obtaining module 101 can obtain the file 111 from a predetermined location.

In at least one exemplary embodiment, when the file 111 is stored in the storage device 11, the storage device 11 is the predetermined location. In other exemplary embodiments, when the file 111 is stored in another storage device such as a server, the other storage device is the predetermined location.

In at least one exemplary embodiment, the obtaining module 101 can obtain the file 111 from the storage device 11. In other exemplary embodiments, when the file 111 is stored in another storage device such as the server, the obtaining module 101 can directly download the file 111 from the server.

At block 32, the determining module 102 can calculate a number of blocks into which the file 111 is to be split using a preset formula according to a capacity of the send buffer 121 and a probability of availability of the transmitting channel 2. In at least one exemplary embodiment, the probability of availability of the transmitting channel 2 can be defined to be a probability of availability of the transmitting channel 2 for transmitting data.

In at least one exemplary embodiment, the determining module 102 can calculate the probability of availability of the transmitting channel 2 according to an average time of the transmitting channel 2 being available to transmit data in a predetermined time period (such as 30 minutes, or 45 minutes) and an average time of repairing the transmitting channel 2 in the predetermined time period.

In at least one exemplary embodiment, the predetermined time period equals a sum of the average time of the transmitting channel 2 being available to transmit data and the average time of repairing the transmitting channel 2. The probability of availability of the transmitting channel 2 equals a value that is obtained by dividing the average time of the transmitting channel 2 being available to transmit data by the predetermined time period.

In at least one exemplary embodiment, the preset formula is:

$$P_{(x,n,v)} = \begin{cases} \dfrac{t_F - \dfrac{x}{n*v}}{t_F + t_R}, & \dfrac{x}{n*v} \in [0, t_F) \\ 0, & \dfrac{x}{n*v} \in [t_F, +\infty] \end{cases}$$

Wherein "P(x, n, v)" represents a probability of the transmitting channel 2 successfully transmitting the file 111, "$t_F$" represents the average time of the transmitting channel 2 being available to transmit data, "$t_R$" represents the average time of repairing the transmitting channel 2, "x" represents the size of the file 111, "n" represents the number of blocks into which the file 111 is to be split, "v" represents a speed of the transmitting channel 2 transmitting the file 111, and $$\dfrac{x}{n*v}$$

represents a time length of the transmitting channel 2 transmitting each block of the split file 111.

In at least one exemplary embodiment, the determining module 102 can calculate the number of blocks using the preset formula according to the following conditions. The conditions include:

A first condition: a size of each block (i.e., a value of "x/n") is less than the capacity of send buffer 121; and A second condition: under the first condition is met, the size of each of the number of blocks (i.e., the value of "x/n") reaches the maximum size.

In other exemplary embodiments, the determining module 102 can calculate the number of blocks using the preset formula according to the first condition and a third condition. The third condition is: under the first condition is met, a value of "P(x, n, v)" reaches the maximum value.

The following examples are to clarify. It is assumed that the average time of the transmitting channel 2 being available to transmit data (i.e., "$t_F$") equals 340 seconds, the average time of repairing the transmitting channel 2 (i.e., "$t_R$") equals 10 seconds, the size of the file 111 is 1 GB, the speed of the transmitting channel 2 transmittings the file 111 is 0.01 GB per second (GB/s), and the capacity of the send buffer 121 is 0.15 GB.

For a first example, as shown in FIG. 4, if "n" equals five (i.e., if the file 111 is split into five blocks), then the size of each of the five blocks equals 0.2 GB, thus the size of each of the five blocks is greater than the capacity (e.g., 0.15 GB) of the send buffer 121. Therefore, the first condition is not met. For a second example, if "n" equals six (i.e., if the file 111 is split into six blocks), then the size of each of the six blocks equals 0.167 GB, and the size of each of the six blocks is greater than the capacity (e.g., 0.15 GB) of the send buffer 121. Therefore, the first condition is again not met. For a third example, if "n" equals seven (i.e., if the file 111 is split into seven blocks), then the size of each of the seven blocks equals 0.142 GB, and the value of P(x, n, v) equals 0.93. If "n" is equal to eight (i.e., if the file 111 is split into eight blocks), then the size of each of the eight blocks equals 0.125 GB, and the value of P(x, n, v) equals 0.935. Therefore, when "n" equals seven or eight, the size of each of the "n" blocks is less than the capacity of the send buffer 121. Further, when "n" equals seven, the size of each of the "n" blocks reaches the maximum possible size (i.e., 0.142 GB). Therefore, the determining module 102 can determine that the number of split blocks of the file 111 equals seven according to the first and second conditions. In other exemplary embodiments, the determining module 102 can determine that the number of split blocks of the file 111 should be eight according to the first and third conditions.

At block 33, the splitting module 103 can split the file 111 into the number of blocks.

For example, the splitting module 103 can split the file 111 into seven blocks. A size of each of the seven blocks equals 0.142 GB.

At block 34, the coding module 104 can code each of the number of blocks, and obtain the number of coded blocks.

In at least one exemplary embodiment, the coding module 104 can code each of the number of blocks by converting each of the number of blocks into binary format, octal format, or decimal format.

At block 35, the sending module 105 can read each of the number of coded blocks and buffer each coded block in the send buffer 121 according to an order of coding. The sending module 105 can further execute data encapsulation for each of the number of coded blocks according to a file transfer protocol (e.g., file delivery over unidirectional transport (FLUTE) protocol). The sending module 105 can send each encapsulated block to the destination 3 through the transmitting channel 2.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A method for splitting files applied to an electronic device, the electronic device comprising a memory, the method comprising:
   obtaining a file;
   calculating a number of blocks into which the file is to be split using a preset formula according to a capacity of a send buffer of the memory and a probability of a transmitting channel being available to transmit data, wherein the probability of the transmitting channel being available to transmit data is calculated according to an average time of the transmitting channel being available to transmit data in a predetermined time period and an average time of repairing the transmitting channel in the predetermined time period, wherein the average time of repairing the transmitting channel in the predetermined time period equals a value that is obtained by subtracting the average time of the transmitting channel being available to transmit data from the predetermined time period; and
   splitting the file into the number of blocks;

wherein the preset formula is:

$$P_{(x,n,v)} = \begin{cases} \dfrac{t_F - \dfrac{x}{n*v}}{t_F + t_R}, & \dfrac{x}{n*v} \in [0, t_F) \\ 0, & \dfrac{x}{n*v} \in [t_F, +\infty] \end{cases}$$

wherein "P(x, n, v)" represents a probability of the transmitting channel successfully transmitting the file, "$t_F$" represents the average time of the transmitting channel being available to transmit data, "$t_R$" represents the average time of repairing the transmitting channel, "x" represents the size of the file, "n" represents the number of blocks into which the file is to be split, "v" represents a speed of the transmitting channel transmitting the file, and $$\frac{x}{"n*v"}$$

represents a time length of the transmitting channel transmitting each block.

2. The method according to claim 1, wherein the method further comprises:
   coding the number of blocks;
   reading each of the number of coded blocks and buffering the each of the number of coded blocks in the send buffer;
   encapsulating each of the number of coded blocks according to a preset file transfer protocol; and
   sending each of the number of encapsulated blocks to a destination through the transmitting channel.

3. The method according to claim 1, wherein the probability of the transmitting channel being available to transmit data is equal to a value that is obtained by dividing the average time of the transmitting channel being available to transmit data in the predetermined time period by the predetermined time period.

4. The method according to claim 1, wherein the number of blocks is calculated using the preset formula according to a first condition and a second condition, wherein the first condition is that a size of each of the number of blocks is less than the capacity of send buffer; and the second condition is that under the first condition is met, the size of each of the number of blocks reaches the maximum size.

5. The method according to claim 1, wherein the number of blocks is calculated using the preset formula according to a first condition and a third condition, wherein the first condition is that a size of each of the number of blocks is less than the capacity of send buffer; and the third condition is that under the first condition being met, a value of the "P(x, n, v)" reaches the maximum value.

6. The method according to claim 1, wherein a size of the file is greater than the capacity of the send buffer.

7. An electronic device, comprising:
   a memory;
   a storage device; and
   at least one processor, wherein the storage device stores one or more programs that, when executed by the at least one processor, the one or more programs cause the at least one processor to:
   obtain a file from a predetermined location;
   calculate a number of blocks into which the file is to be split using a preset formula according to a capacity of a send buffer of the memory and a probability of a transmitting channel being available to transmit data, wherein the probability of the transmitting channel being available to transmit data is calculated according to an average time of the transmitting channel being available to transmit data in a predetermined time period and an average time of repairing the transmitting channel in the predetermined time period, wherein the average time of repairing the transmitting channel in the predetermined time period equals a value that is obtained by subtracting the average time of the transmitting channel being available to transmit data from the predetermined time period; and split the file into the number of blocks;

wherein the preset formula is:

$$P_{(x,n,v)} = \begin{cases} \dfrac{t_F - \dfrac{x}{n*v}}{t_F + t_R}, & \dfrac{x}{n*v} \in [0, t_F) \\ 0, & \dfrac{x}{n*v} \in [t_F, +\infty] \end{cases}$$

wherein "P(x, n, v)" represents a probability of the transmitting channel successfully transmitting the file, "$t_F$" represents the average time of the transmitting channel being available to transmit data, "$t_R$" represents the average time of repairing the transmitting channel, "x" represents the size of the file, "n" represents the number of blocks into which the file is to be split, "v" represents a speed of the transmitting channel transmitting the file, and $$\dfrac{x}{\backslash\backslash n*v\prime\prime}$$

represents a time length of the transmitting channel transmitting each block.

8. The electronic device according to claim 7, wherein the at least one processor is further caused to:
code the number of blocks;
read each of the number of coded blocks and buffer the each of the number of coded blocks in the send buffer;
encapsulate each of the number of coded blocks according to a preset file transfer protocol; and
send each of the number of encapsulated blocks to a destination through the transmitting channel.

9. The electronic device according to claim 7,
wherein the probability of the transmitting channel being available to transmit data is equal to a value that is obtained by dividing the average time of the transmitting channel being available to transmit data in the predetermined time period by the predetermined time period.

10. The electronic device according to claim 7, wherein the number of blocks is calculated using the preset formula according to a first condition and a second condition, wherein the first condition is that a size of each of the number of blocks is less than the capacity of send buffer; and the second condition is that under the first condition is met, the size of each of the number of blocks reaches the maximum size.

11. The electronic device according to claim 7, wherein the number of blocks is calculated using the preset formula according to a first condition and a third condition, wherein the first condition is that a size of each of the number of blocks is less than the capacity of send buffer; and the third condition is that under the first condition is met, a value of the "P(x, n, v)" reaches the maximum value.

12. The electronic device according to claim 7, wherein a size of the file is greater than the capacity of the send buffer.

13. A non-transitory storage medium having stored thereon instructions that, when executed by a processor of an electronic device, causes the processor to perform a method of splitting files, the electronic device comprising a memory, the method comprising:
obtaining a file from a predetermined location;
calculating a number of blocks into which the file is to be split using a preset formula according to a capacity of a send buffer of the memory and a probability of a transmitting channel being available to transmit data, wherein the probability of the transmitting channel being available to transmit data is calculated according to an average time of the transmitting channel being available to transmit data in a predetermined time period and an average time of repairing the transmitting channel in the predetermined time period, wherein the average time of repairing the transmitting channel in the predetermined time period equals a value that is obtained by subtracting the average time of the transmitting channel being available to transmit data from the predetermined time period; and
splitting the file into the number of blocks;
wherein the preset formula is:

$$P_{(x,n,v)} = \begin{cases} \dfrac{t_F - \dfrac{x}{n*v}}{t_F + t_R}, & \dfrac{x}{n*v} \in [0, t_F) \\ 0, & \dfrac{x}{n*v} \in [t_F, +\infty] \end{cases}$$

wherein "P(x, n, v)" represents a probability of the transmitting channel successfully transmitting the file, "$t_F$" represents the average time of the transmitting channel being available to transmit data, "$t_R$" represents the average time of repairing the transmitting channel, "x" represents the size of the file, "n" represents the number of blocks into which the file is to be split, "v" represents a speed of the transmitting channel transmitting the file, and $$\dfrac{x}{\backslash\backslash n*v\prime\prime}$$

represents a time length of the transmitting channel transmitting each block.

14. The non-transitory storage medium according to claim 13, wherein the method further comprises:
coding the number of blocks;
reading each of the number of coded blocks and buffering the each of the number of coded blocks in the send buffer;
encapsulating each of the number of coded blocks according to a preset file transfer protocol; and
sending each of the number of encapsulated blocks to a destination through the transmitting channel.

15. The non-transitory storage medium according to claim 13,
wherein the probability of the transmitting channel being available to transmit data is equal to a value that is obtained by dividing the average time of the transmitting channel being available to transmit data in the predetermined time period by the predetermined time period.

16. The non-transitory storage medium according to claim 13, wherein the number of blocks is calculated using the preset formula according to a first condition and a second condition, wherein the first condition is that a size of each of the number of blocks is less than the capacity of send buffer; and the second condition is that under the first condition being met, the size of each of the number of blocks reaches the maximum size.

17. The non-transitory storage medium according to claim 13, wherein the number of blocks is calculated using the preset formula according to a first condition and a third condition, wherein the first condition is that a size of each of the number of blocks is less than the capacity of send buffer; and the third condition is that under the first condition being met, a value of the "P(x, n, v)" reaches the maximum value.

* * * * *